United States Patent
Choi et al.

(10) Patent No.: US 10,263,306 B2
(45) Date of Patent: Apr. 16, 2019

(54) METAL AIR BATTERY AND GAS DIFFUSION LAYER THEREOF

(71) Applicant: Samsung Electronics Co., Ltd., Suwon-si, Gyeonggi-do (KR)

(72) Inventors: Kyounghwan Choi, Suwon-si (KR); Jungock Park, Yongin-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 259 days.

(21) Appl. No.: 15/082,092

(22) Filed: Mar. 28, 2016

(65) Prior Publication Data

US 2016/0336602 A1 Nov. 17, 2016

(30) Foreign Application Priority Data

May 15, 2015 (KR) .................. 10-2015-0068190

(51) Int. Cl.
*H01M 8/0258* (2016.01)
*H01M 12/02* (2006.01)
*H01M 12/08* (2006.01)

(52) U.S. Cl.
CPC ........... *H01M 12/08* (2013.01); *Y02E 60/128* (2013.01)

(58) Field of Classification Search
CPC ..... H01M 8/0258; H01M 12/02; H01M 12/08
See application file for complete search history.

(56) References Cited

U.S. PATENT DOCUMENTS

| 4,555,324 | A | 11/1985 | Ueno et al. |
| 7,824,806 | B2 | 11/2010 | Visco et al. |
| 8,871,394 | B1 | 10/2014 | Garcia et al. |
| 2013/0189592 | A1 | 7/2013 | Roumi et al. |
| 2014/0335392 | A1 | 11/2014 | Visco et al. |
| 2015/0037692 | A1* | 2/2015 | Park ..................... H01M 2/0255 429/405 |
| 2015/0140452 | A1 | 5/2015 | Park et al. |

FOREIGN PATENT DOCUMENTS

| KR | 1020150016730 A | 2/2015 |
| KR | 1020150058616 A | 5/2015 |

* cited by examiner

*Primary Examiner* — Osei K Amponsah
(74) *Attorney, Agent, or Firm* — Cantor Colburn LLP

(57) ABSTRACT

A metal air battery including: a gas diffusion layer having a first surface and a second surface opposite to the first surface; at least one positive electrode layer disposed on the first surface and the second surface of the gas diffusion layer, wherein the positive electrode layer is configured to use oxygen as an active material and includes a first electrolyte; a second electrolyte disposed on the positive electrode layer; and a negative electrode metal layer disposed on the second electrolyte, wherein a side surface of the gas diffusion layer, which connects the first surface and the second surface of the gas diffusion layer, is exposed to an outside of the metal air battery, and the gas diffusion layer comprises an air flow channel that extends from the side surface of the gas diffusion layer which is exposed to the outside, to an inside of the gas diffusion layer.

20 Claims, 16 Drawing Sheets

METAL AIR BATTERY AND GAS DIFFUSION LAYER THEREOF

CROSS-REFERENCE TO RELATED APPLICATION

This application claims priority to and the benefit of Korean Patent Application No. 10-2015-0068190, filed on May 15, 2015, in the Korean Intellectual Property Office, and all the benefits accruing therefrom under 35 U.S.C. § 119, the content of which is incorporated herein in its entirety by reference.

BACKGROUND

1. Field

The present disclosure relates to metal air batteries and gas diffusion layers thereof, and more particularly, to a metal air battery, which may be more easily supplied with air and have an improved energy density.

2. Description of the Related Art

A metal air battery includes a negative electrode capable of ion inclusion/emission and a positive electrode using oxygen in the air as an active material. In the metal air battery, an oxygen reduction/oxidation reaction occurs in the positive electrode and a metal oxidation/reduction reaction occurs in the negative electrode to convert chemical energy into electrical energy. The metal air battery absorbs oxygen in a discharge mode and emits oxygen in a charge mode. Because the metal air battery uses oxygen from the air, the energy density of the battery may be dramatically improved relative to a battery which contains the cathode active material. For example, the metal air battery may have an energy density which is several times than that of a lithium ion battery.

Also, the metal air battery has excellent stability because it has a low possibility of ignition caused by abnormally-high temperatures, and the metal air battery also has a low possibility of causing environmental pollution because it operates by oxygen absorption/emission with reduced use of heavy metals. Nonetheless, there remains a need for an improved metal air battery.

SUMMARY

Provided is a metal air battery having a gas diffusion layers that may provide improved supply of oxygen to a positive electrode layer.

Additional aspects will be set forth in part in the description which follows and, in part, will be apparent from the description, or may be learned by practice of the presented exemplary embodiments.

According to an aspect, a metal air battery includes: a gas diffusion layer having a first surface and a second surface opposite to the first surface; at least one positive electrode layer disposed on the first surface and the second surface of the gas diffusion layer, wherein the positive electrode layer is configured to use oxygen as an active material and includes a first electrolyte for ion conduction; a second electrolyte disposed on the positive electrode layer; and a negative electrode metal layer disposed on the second electrolyte, wherein at least one side surface among side surfaces of the gas diffusion layer, which connect the first surface and the second surface of the gas diffusion layer, is exposed to an outside of the metal air battery, and the gas diffusion layer comprises at least one air flow channel that extends from the at least one side surface of the gas diffusion layer, which is exposed to the outside, to an inside of the gas diffusion layer.

An extension direction of the air flow channel may intersect a normal direction of the first surface.

The air flow channel may be provided in plurality, and the plurality of air flow channels may be spaced apart from each other in a direction intersecting the normal direction of the first surface and intersecting the extension direction of the air flow channel.

The side surfaces of the gas diffusion layer may include a first side surface and a second side surface opposite to the first side surface, and the at least one air flow channel may include at least one first air flow channel extending toward the inside from the first side surface and at least one second air flow channel extending toward the inside from the second side surface.

A height of the air flow channel may be equal to a thickness of the gas diffusion layer.

A height of the air flow channel may be smaller than a thickness of the gas diffusion layer.

The air flow channel may be provided in plurality, and the plurality of air flow channels may be disposed along a normal direction of the first surface.

The air flow channel may include a straight section extending in a straight line or a curved section extending in a curved line.

The air flow channel may be provided in plurality, and the plurality of air flow channels may be disposed symmetrically or asymmetrically.

A sectional shape of the air flow channel may include at least one of a polygonal shape, a circular shape, and an elliptical shape.

A total area of the air flow channel may be about 1% or more of a total area of the gas diffusion layer.

A width of the air flow channel may be about 0.1 mm to about 5 mm.

A width of the air flow channel may be maintained uniformly along an extension direction of the air flow channel.

A width of the air flow channel may vary along an extension direction of the air flow channel.

The positive electrode layer may include a first positive electrode layer and a second positive electrode layer spaced apart from each other, the first positive electrode layer may be disposed on the first surface of the gas diffusion layer, and the second positive electrode layer may be disposed on the second surface of the gas diffusion layer.

The positive electrode layer may be bent as a single layer to face the first surface, the second surface, and one side surface among the side surfaces of the gas diffusion layer.

To form the battery, the gas diffusion layer may be disposed partially on the positive electrode layer, the negative electrode metal layer, the second electrolyte, and the positive electrode layer may be bent onto the gas diffusion layer such that the positive electrode layer may contact the first surface and the second surface of the gas diffusion layer, and so that a single side surface of the gas diffusion layer may be exposed to the outside.

The gas diffusion layer may be provided in plurality, and the negative electrode metal layer, the second electrolyte, and the positive electrode layer may be repeatedly bent such that the positive electrode layer may contact each of first surfaces and second surfaces of the plurality of gas diffusion layers.

The metal air battery may further include a positive electrode current collector disposed between the positive electrode layer and the gas diffusion layer and including a plurality of pores.

According to an aspect of another exemplary embodiment, a gas diffusion layer of a metal air battery includes: a first surface; a second surface opposite to the first surface; side surfaces connecting the first surface and the second surface; and at least one air flow channel extending toward an inside thereof from at least one side surface among the side surfaces.

In an aspect, a method of manufacturing a metal air battery includes: providing a gas diffusion layer comprising an air flow channel that extends from a side surface of the gas diffusion layer to an inside of the gas diffusion layer; disposing a positive electrode layer on a first surface and on a second surface of the gas diffusion layer, wherein the first surface of the gas diffusion layer is opposite to the second surface of the gas diffusion layer, and wherein the positive electrode layer comprises a first electrolyte; disposing second electrolyte on the positive electrode layer; and disposing a negative electrode metal layer on the second electrolyte to manufacture the metal air battery, wherein the side surface of the gas diffusion layer connects the first surface and the second surface of the gas diffusion layer and is exposed to an outside of the metal air battery.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1A:
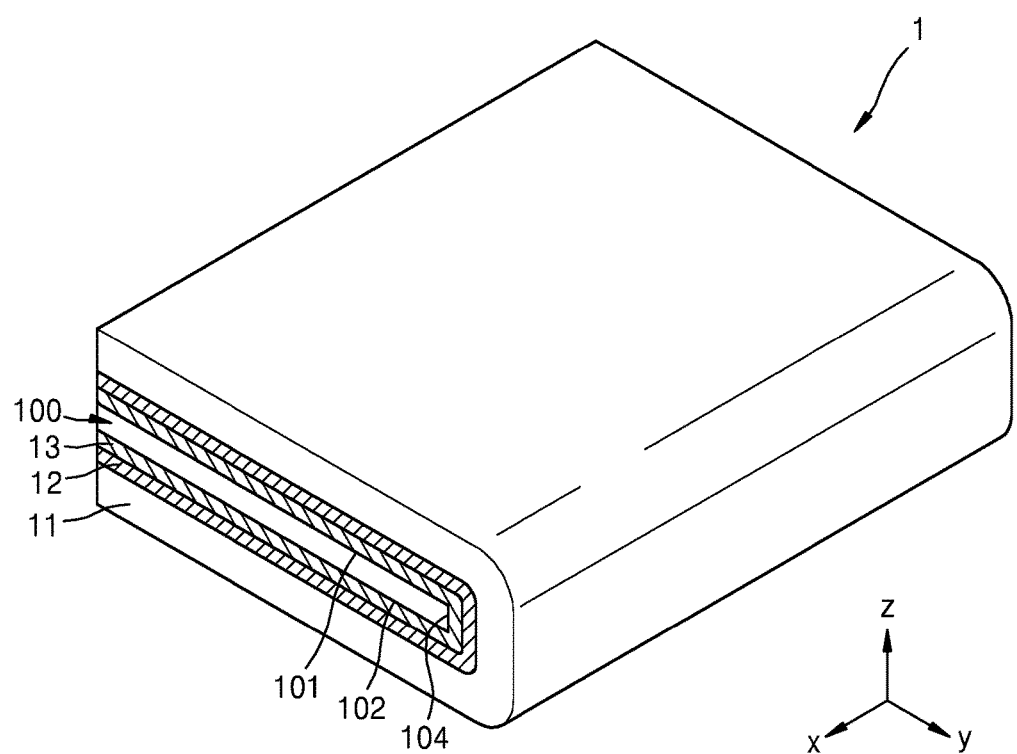
FIG. 1A is a schematic perspective rear view of an embodiment of a metal air battery.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the disclosed embodiments. As used herein, the term "and/or" includes any and all combinations of one or more of the associated listed items. "Or" means "and/or." Expressions such as "at least one of," when preceding a list of elements, modify the entire list of elements and do not modify the individual elements of the list. Hereinafter, an embodiment of a metal air battery will be disclosed with reference to the accompanying drawings. In the drawings, like reference numerals denote like elements, and the sizes of elements may be exaggerated for clarity and convenience of description. The exemplary embodiments described below are merely exemplary, and various changes and modifications may be made therein. It will be understood that when a layer is referred to as being "on" another layer, it may be directly on the other layer, or one or more intervening layers may also be present. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Figure 1B:
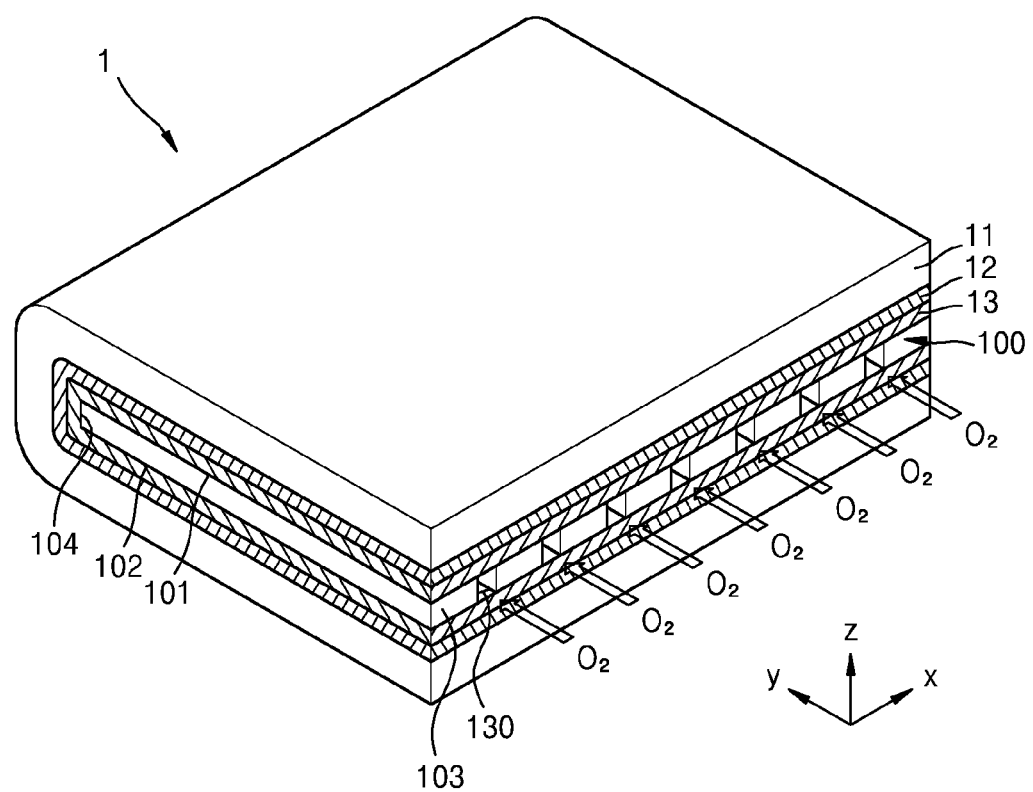
FIG. 1B is a schematic perspective front view of an embodiment of the metal air battery.

FIGS. 1A and 1B are schematic perspective views of an embodiment of a metal air battery 1.

Referring to FIGS. 1A and 1B, the metal air battery 1 includes a negative electrode metal layer 11, a second electrolyte 12, a positive electrode layer 13, and a gas diffusion layer 100.

The negative electrode metal layer 11 can include and emit, e.g., deposit and strip, or intercalate and deintercalate, metal ions and may include, for example, at least one of lithium (Li), sodium (Na), zinc (Zn), potassium (K), calcium (Ca), magnesium (Mg), iron (Fe), aluminum (Al), or an alloy thereof.

The second electrolyte 12 transmits metal ions to the positive electrode layer 13. The second electrolyte 12 may include an electrolyte that is formed by dissolving a metal salt in a solvent. The electrolyte may be a solid phase including a polymer-based electrolyte, an inorganic electrolyte, or a composite electrolyte including a mixture thereof. The electrolyte may be formed to be flexible. For example, the metal salt may include a lithium salt such as $LiN(SO_2CF_2CF_3)_2$, $LiN(SO_2C_2F_5)_2$, $LiClO_4$, $LiBF_4$, $LiPF_6$, $LiSbF_6$, $LiAsF_6$, $LiCF_3SO_3$, $LiN(SO_2CF_3)_2$, $LiC(SO_2CF_3)_3$, $LiN(SO_3CF_3)_2$, $LiC_4F_9SO_3$, $LiAlCl_4$, or lithium bis(trifluoromethanesulfonyl)imide (LiTFSI), and another metal salt such as $AlCl_3$, $MgCl_2$, NaCl, KCl, NaBr, KBr, or $CaCl_2$ may be further added with the lithium salt or used instead of the lithium salt. The solvent may include any suitable material that may dissolve the lithium salt and the metal salt.

Also, the second electrolyte 12 may further include a separator membrane that prevents oxygen transmission and has metal ion conductivity. The separator membrane may include a flexible polymer-based separator membrane. For example, the separator membrane may include a polymer nonwoven fabric such as a polypropylene nonwoven fabric or a polyphenylene sulfide nonwoven fabric, or a porous film of olefin-based resin such as polyethylene or polypropylene. The separator membrane and the electrolyte may be formed as separate layers, or the second electrolyte 12 may be formed as a single layer, for example by impregnating the electrolyte into the pores of the porous separator membrane. For example, the second electrolyte 12 may be formed by impregnating the electrolyte, which can be formed by mixing polyethylene oxide (PEO) and LiTFSI, into the pores of the porous separator membrane.

The positive electrode layer 13 may include a first electrolyte for metal ion conduction, a catalyst for oxygen oxidation/reduction, a conductive material, and a binder. For example, the positive electrode layer 13 may be formed by mixing the electrolyte, the catalyst, the conductive material, and the binder, adding a solvent to the resulting mixture to form a positive electrode slurry, coating the positive electrode slurry on the second electrolyte 12, and drying the coated positive electrode slurry.

Herein, the first electrolyte may include a lithium salt or a metal salt, e.g., as disclosed above. The conductive material may include, for example, at least one of a porous carbon-based material, a conductive metal material, or a conductive organic material. For example, the carbon-based material may include carbon black, graphite, graphene, activated carbon, carbon fiber, or carbon nanotube. The conductive metal material may include, for example, a metal powder. For example, the catalyst may include platinum (Pt), gold (Au), or silver (Ag) and may include an oxide of manganese (Mn), nickel (Ni), or cobalt (Co). Also, the binder may include, for example, polytetrafluoroethylene (PTFE), polypropylene, polyvinylidene fluoride (PVDF), polyethylene, or styrene-butadiene rubber.

The gas diffusion layer 100 may receive, e.g., absorb, oxygen in the air and provide the oxygen to the positive electrode layer 13. For this purpose, the gas diffusion layer 100 may have a porous structure for smoothly diffusing the external oxygen. The gas diffusion layer 100 may have a plurality of pores, and a pore size of the gas diffusion layer may be 10 micrometers (µm) or less, 0.01 µm to 10 µm, or 0.1 µm to 1 µm.

The gas diffusion layer 100 may be electrically conductive. For example, the gas diffusion layer 100 may have an electrical conductivity of about $10^7$ Siemens per meter (S/m) to about $10^2$ S/m, or about $10^6$ S/m to about $10^3$ S/m. The gas diffusion layer 100 may comprise a carbon fiber-based carbon paper, carbon cloth, carbon felt, sponge-shaped foamed metal, or a metal fiber mat.

However, the material of the gas diffusion layer 100 is not limited thereto and may be electrically insulating. For example, the gas diffusion layer 100 may have an electrical conductivity of about $10^3$ S/m to about $10^{-13}$ S/m, or about 10 S/m to about $10^{-5}$ S/m. For example, the gas diffusion layer 100 may comprise an insulating material. The gas diffusion layer 100 may comprise, for example, at least one polymer selected from a homopolymer, a block copolymer, and a random copolymer. In an embodiment, the gas diffusion layer 100 may include at least one polymer obtained from at least one acrylate monomer selected from polyethylene, polypropylene, polyethylene terephthalate, polyphenylene sulfide, poly-2-vinylpyridine, polytetrafluoroethylene, tetrafluoroethylene-hexafluoropropylene copolymer, polychlorotrifluoroethylene, perfluoroalkoxy copolymer, fluorinated cyclic ether, polyethylene oxide diacrylate, polyethylene oxide dimethacrylate, polypropylene oxide diacrylate, polypropylene oxide dimethacrylate, polymethylene oxide diacrylate, polymethylene oxide dimethacrylate, a poly alkyldiol diacrylate, a poly alkyldiol dimethacrylate, poly-divinylbenzene, polyether, polycarbonate, polyamide, polyester, polyvinyl chloride, polyimide, polycarboxylic acid, polysulfonic acid, polyvinyl alcohol, polysulfone, polystyrene, polyethylene, polypropylene, poly(p-phenylene), polyacetylene, poly(p-phenylene vinylene), polyaniline, polypyrrole, polythiophene, poly(2,5-ethylene vinylene), polyacene, poly(naphthalene-2,6-diyl), polyethylene oxide, polypropylene oxide, polyvinylidene fluoride, copolymer of vinylidene fluoride and hexafluoropropylene, poly(vinyl acetate), poly(vinyl butyral-co-vinyl alcohol-co-vinyl acetate), poly(methyl methacrylate-co-ethyl acrylate), polyacrylonitrile, polyvinyl chloride, co-vinyl acetate, poly (1-vinylpyrrolidone-co-vinyl acetate), polyvinylpyrrolidone, polyacrylate, polymethacrylate, polyurethane, polyvinyl ether, acrylonitrile-butadiene rubber, styrene-butadiene rubber, acrylonitrile-butadiene-styrene rubber, sulfonated styrene/ethylene-butylene triblock copolymer, ethoxylated neopentyl glycol diacrylate, ethoxylated bisphenol A diacrylate, ethoxylated aliphatic urethane acrylate, ethoxylated alkylphenol acrylate, and alkyl acrylate, and may comprise at least one polymer selected from polyvinyl alcohol, polyimide, epoxy resin, and acrylic resin. However, the material of the gas diffusion layer 100 is not limited thereto, and the gas diffusion layer 100 may include any suitable polymer that may be used to form a suitable porous organic layer.

The gas diffusion layer 100 has a first surface 101, a second surface 102 which is opposite to the first surface 101, and a side surface connecting the first surface 101 and the second surface 102.

The positive electrode layer 13 may be disposed on each of the first surface 101 and the second surface 102 of the gas diffusion layer 100.

As an example, the positive electrode layer 13 may be a single layer and may be bent to face at least three surfaces of the gas diffusion layer 100. The positive electrode layer 13 may be bent to face the first surface 101, the second surface 102, and a second side surface 104 of the gas diffusion layer 100. A first side surface 103 of the gas diffusion layer 100 may be exposed to an outside of the metal air battery. For example, the gas diffusion layer 100 may be disposed partially on the positive electrode layer 13, which comprises the first electrolyte; and the negative electrode metal layer 11, the second electrolyte 12, and the positive electrode layer 13 may be bent onto the gas diffusion layer 100 such that the positive electrode layer 13 contacts the first surface 101 and the second surface 102 of the gas diffusion layer 100; and to provide the first side surface 103 of the gas diffusion layer 100 exposed to the outside.

In an embodiment, an exterior material (not illustrated) may surround the other external surfaces of the negative electrode metal layer 11, the second electrolyte 12, the positive electrode layer 13, and the gas diffusion layer 100, except the exposed first side surface 103 of the gas diffusion layer 100.

Figure 2A:
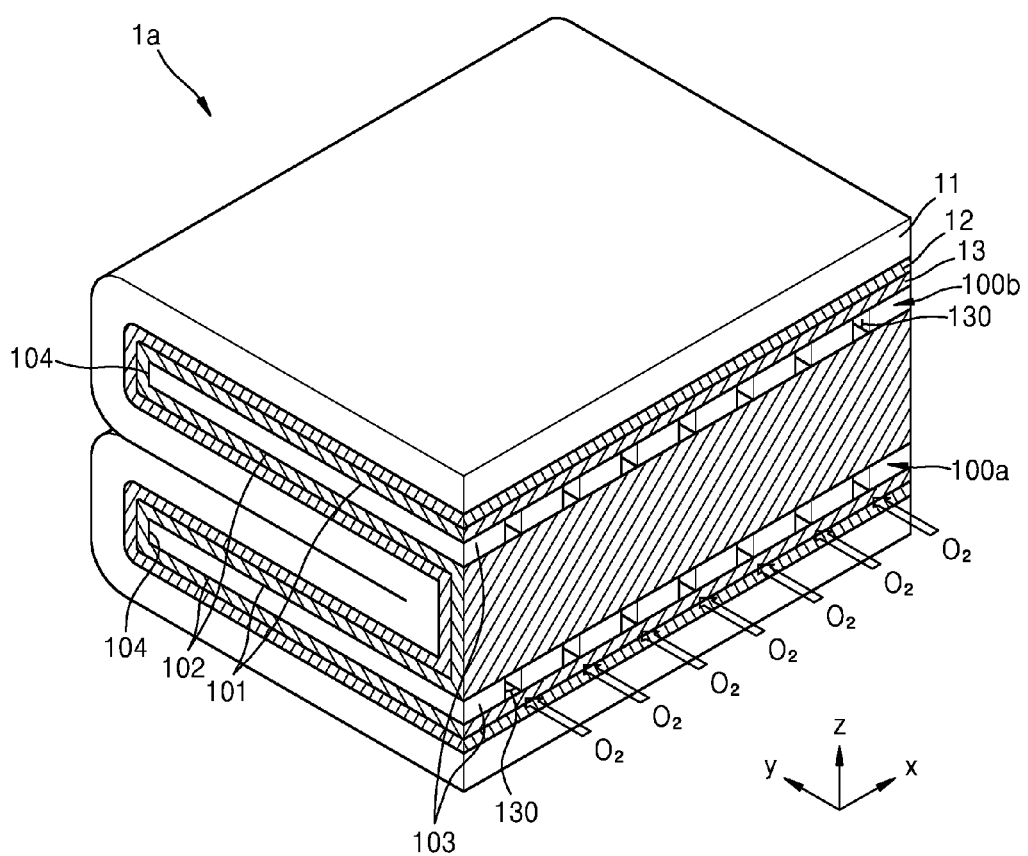
FIG. 2A is a schematic perspective view of another embodiment of a metal air battery.

An example in which the positive electrode layer 13, which comprises the first electrolyte, is a single layer is not limited thereto. For example, as illustrated in FIG. 2A, a metal air battery 1a may include a plurality of, for example, two gas diffusion layers, e.g., a first gas diffusion layer 100a and a second gas diffusion layer 100b. The negative electrode metal layer 11, the second electrolyte 12, and the positive electrode layer 13 may be bent such that the positive electrode layer 13 may contact each of the first surfaces 101 and the second surfaces 102 of each gas diffusion layer of the plurality of gas diffusion layers, e.g., the first gas diffusion layer 100a and the second gas diffusion layer 100b.

Figure 2B:
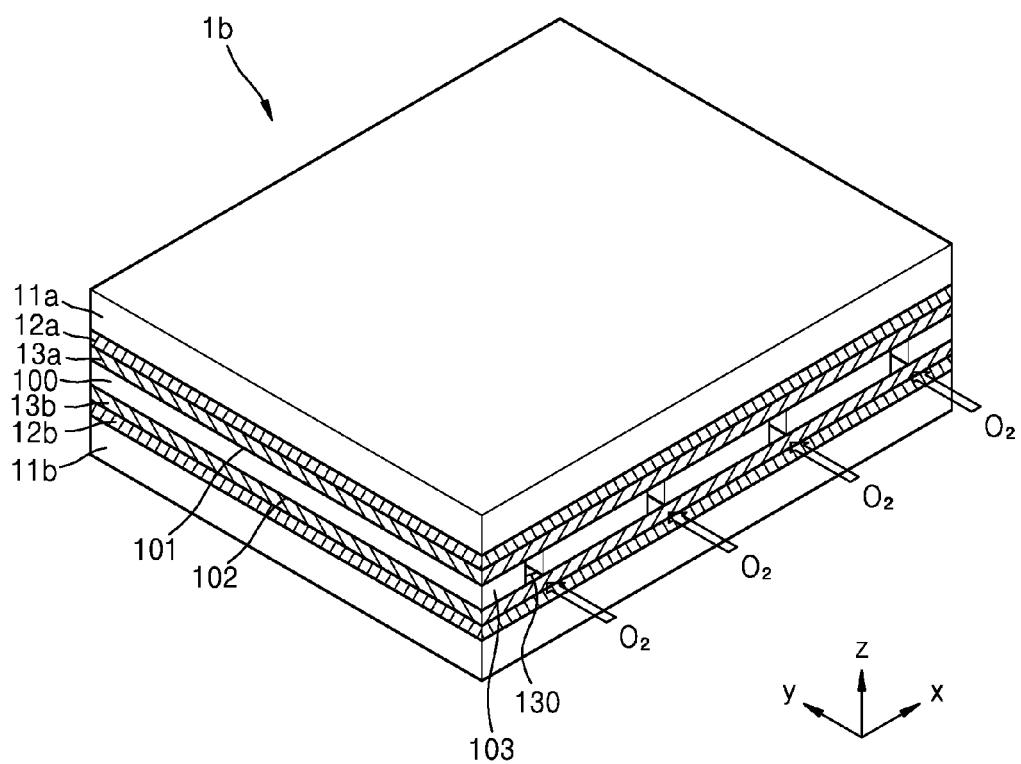
FIG. 2B is a schematic perspective view of yet another embodiment of a metal air battery.

As another example, as illustrated in FIG. 2B, the positive electrode layer 13 may include a plurality of layers that are spaced apart from each other. For example, the positive electrode layer 13 may include a first positive electrode layer 13a and a second positive electrode layer 13b that are spaced apart from each other. The first positive electrode layer 13a may be disposed on the first surface 101 of the gas diffusion layer 100, and the second positive electrode layer 13b may be disposed on the second surface 102 of the gas diffusion layer 100. The first positive electrode layer 13a may comprise the first electrolyte, and a second electrolyte 12a and a negative electrode metal layer 11a may be sequentially disposed on the gas diffusion layer 100. The second positive electrode layer 13b may comprise the first electrolyte, and a second electrolyte 13b and a negative electrode metal layer 11 b may be sequentially disposed under the gas diffusion layer 100.

In the above structure in which the positive electrode layer 13 is disposed on the first surface 101 and the second surface 102 of the gas diffusion layer 100, the first surface 101 and the second surface 102 of the gas diffusion layer 100 are not exposed to the outside. Accordingly, air is supplied to the gas diffusion layer 100 through the side surface. For example, air is supplied to the gas diffusion layer 100 through the first side surface 103 among the side surfaces.

The metal air battery 1 may have a structure in which air is smoothly supplied through the exposed side surface of the gas diffusion layer 100.

Figure 3:
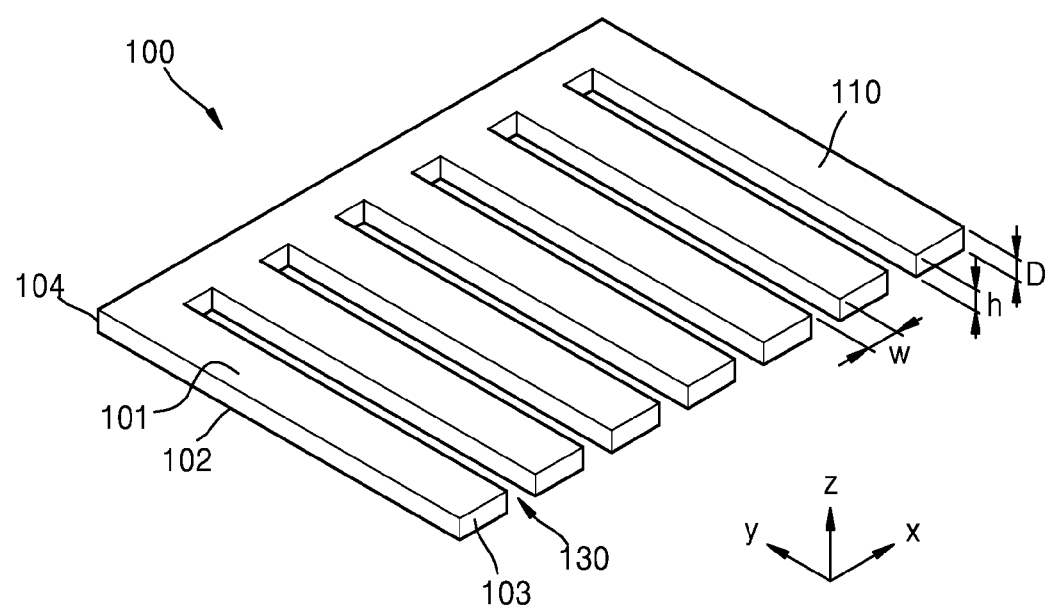
FIG. 3 is a schematic view of an embodiment of a gas diffusion layer.
Figure 4:
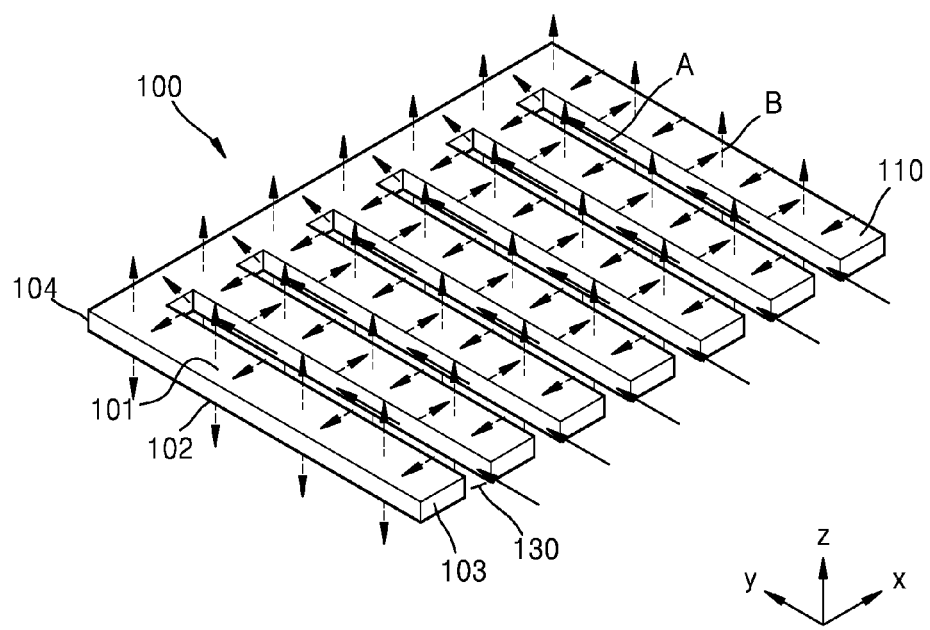
FIG. 4 is a diagram illustrating an air flow in the gas diffusion layer of FIG. 3.

FIG. 3 is a schematic view of an embodiment of the gas diffusion layer 100. FIG. 4 is a diagram illustrating an air flow in the gas diffusion layer 100 of FIG. 3.

Referring to FIG. 3, the gas diffusion layer 100 may have at least one air flow channel 130 that extends toward an inside of the gas diffusion layer from the first side surface 103, which may be exposed to the outside. For example, the gas diffusion layer 100 may have a diffusion portion 110 for gas diffusion and at least one air flow channel 130.

In an embodiment comprising a plurality of the at least one air flow channel 130, the air flow channels may be spaced apart from each other in a direction (e.g., an x direction) intersecting a normal direction (e.g., a z direction) of the first surface 101. A width w of each air flow channel 130 may be about 0.1 mm to about 5 mm, about 0.3 mm to about 3 mm, or about 0.5 mm to about 1 mm. A height h of each air flow channel 130 may be about 50 μm to about 500 μm, about 60 μm to about 400 μm, or about 70 μm to about 300 μm. A variation of a width of the air flow channel may be about 5 percent or less, about 0.1% to about 5%, or about 0.5% to about 3% of an average width along an extension direction of the air flow channel. A variation of a width of the air flow channel may be greater than about 5 percent, about 5% to about 25%, or about 10% to about 20% of an average width along an extension direction of the air flow channel.

A total area, e.g., total projected area, of the at least one air flow channel 130 may be about 1% or more of a total area, e.g., a total projected area of about 1% to about 50%, or about 2% to about 40%, of the gas diffusion layer 100. Herein, the total area of the gas diffusion layer 100 is defined as the sum of the total area of the diffusion portion 110 and the total area of the air flow channel 130.

An extension direction (e.g., a y direction) of each air flow channel 130 may intersect the normal direction (e.g., the z direction) of the first surface 101. For example, the extension direction of the air flow channel 130 may be perpendicular to the normal direction (the z direction) of the first surface 101.

Referring to FIG. 4, air is supplied through the exposed first side surface 103 of the gas diffusion layer 100. As indicated by arrow A, at least a portion of the supplied air flows into and through the air flow channel 130. In the process of the air flowing into or through the air flow channel 130, air is supplied to the diffusion portion 110 as indicated by dashed arrow B. The air supplied to the diffusion portion 110 is transmitted by diffusion to the positive electrode layer 13, which is disposed on/under the gas diffusion layer 100.

The flow of air through the air flow channel 130 may be caused by a pressure difference and/or a temperature difference. The flow of air through the diffusion portion 110 may be caused by an oxygen concentration difference, convection, or a combination thereof. The flow rate of air through the air flow channel 130 may be higher than a flow rate of air through the diffusion portion 110. Accordingly, the air may be rapidly supplied throughout the gas diffusion layer 100.

If the air flow channel 130 is not provided, the air flow of the gas diffusion layer 100 may be caused only by diffusion. The air flow caused by diffusion is relatively slow, and it may be difficult to uniformly supply the air throughout the gas diffusion layer 100 using only diffusion. For example, the oxygen concentration difference between a portion adjacent to the exposed first side surface 103 of the gas diffusion layer 100 and a portion most remote from the exposed first side surface 103 may be about 10 percent (%) or more, about 10% to about 50%, or about 15% to about 40%.

However, the air may be supplied through the air flow channel 130 by minimizing an oxygen saturation concentration change to the position distal, e.g., remote, to the first side surface 103 of the air diffusion layer 100. Thus, it may be easier to uniformly supply the air throughout the gas diffusion layer 100.

Also, since the air may flow through the air flow channel 130, the gas diffusion layer 100 with the air flow channel 130 formed therein may be lighter than the gas diffusion layer without the air flow channel 130 formed therein.

The gas diffusion layer 100 among the components included in the metal air battery 1 may be relatively heavy, e.g., dense. For example, the gas diffusion layer 100 may be heavier than the positive electrode layer 13 or the negative electrode metal layer 11. Thus, the weight reduction of the gas diffusion layer 100 may be closely related to the weight reduction of the metal air battery 1. Accordingly, the specific energy of the metal air battery 1 may be improved by the weight reduction of the gas diffusion layer 100.

Various shapes for the air flow channel 130 are disclosed.

Figure 5:
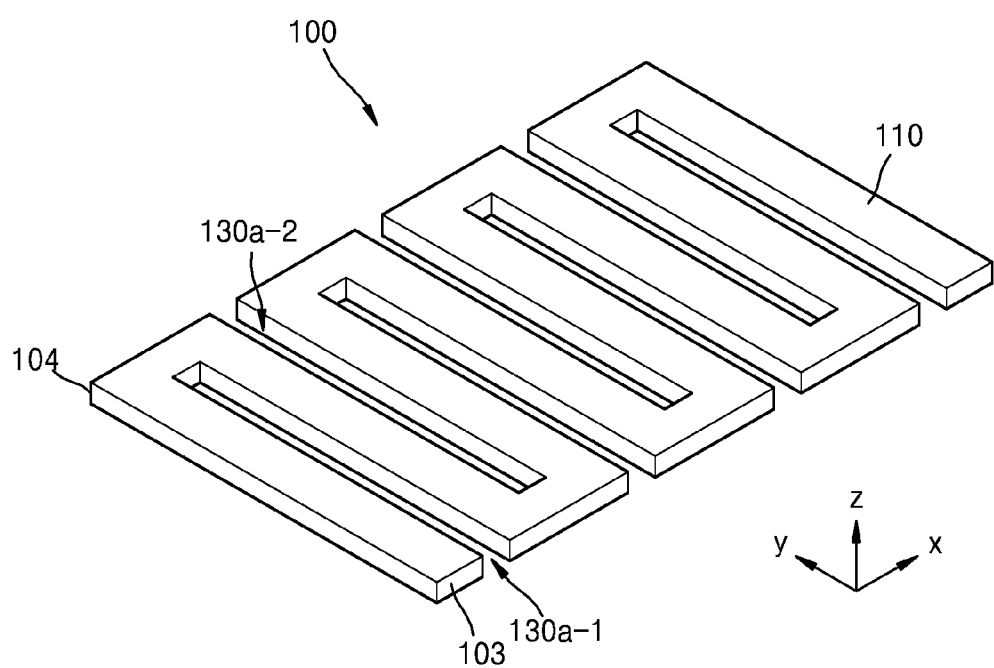
FIGS. 5 is a perspective view illustrating another embodiment of the gas diffusion layer.

As illustrated in FIG. 3, the air flow channel 130 may extend toward the inside of the gas diffusion layer from the first side surface 103. In another embodiment, as illustrated in FIG. 5, first and second air flow channels 130a-1 and 130a-2 may extend from the first side surface 103 and the second side surface 104, which is opposite to the first side surface 103. For example, the air flow channels may comprise the first air flow channel 130a-1, which extends from the first side surface 103 and the second air flow channel 130a-2 extending from the second side surface 104. The first and second air flow channels 130a-1 and 130a-2 may be more useful when a plurality of side surfaces, e.g., the first side surface 103 and the second side surface 104 of the gas diffusion layer 100 are disposed to the outside thereof.

As illustrated in FIG. 3, the air flow channel 130 may pass vertically through the gas diffusion layer 100. A height h of the air flow channel 130 may be equal to a thickness D of the gas diffusion layer 100.

In another exemplary embodiment, a height h1 of the air flow channel 130 may be smaller than the thickness D of the gas diffusion layer 100.

Figure 6A:
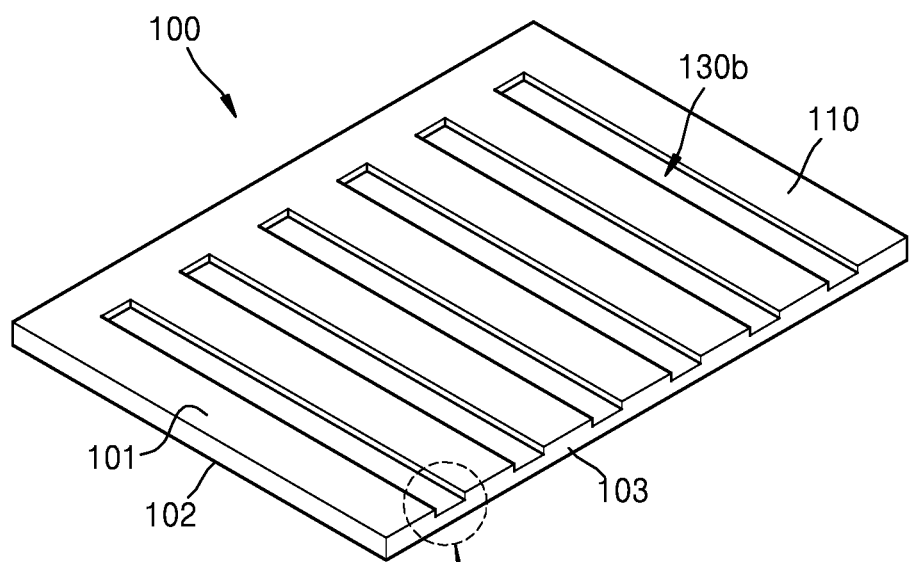
FIGS. 6A is a perspective view illustrating another embodiment of the gas diffusion layer.
Figure 6B:
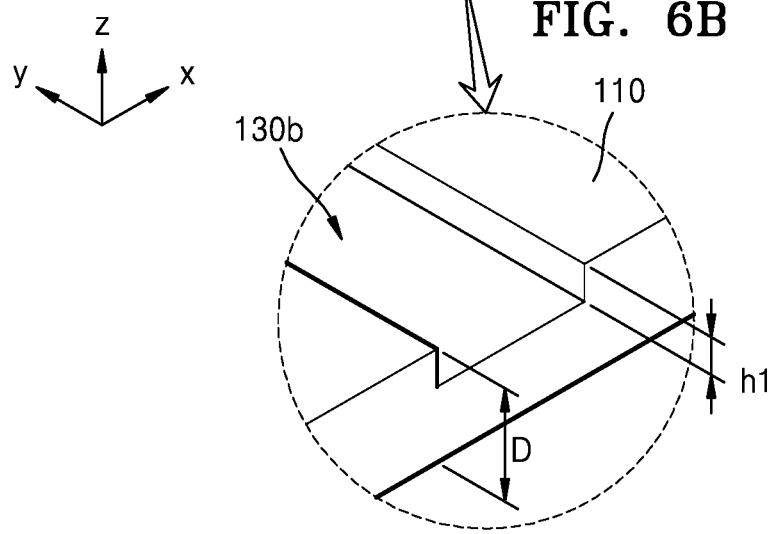
FIG. 6B is an expanded view of the indicated section of the gas diffusion layer shown in FIG. 6A

For example, as illustrated in FIG. 6A, and as shown in the expanded view of FIG. 6B, which is an expanded view of the indicated area of FIG. 6A, an air flow channel 130b may be concave when viewed from the first surface 101 of the gas diffusion layer 100.

Figure 6C:
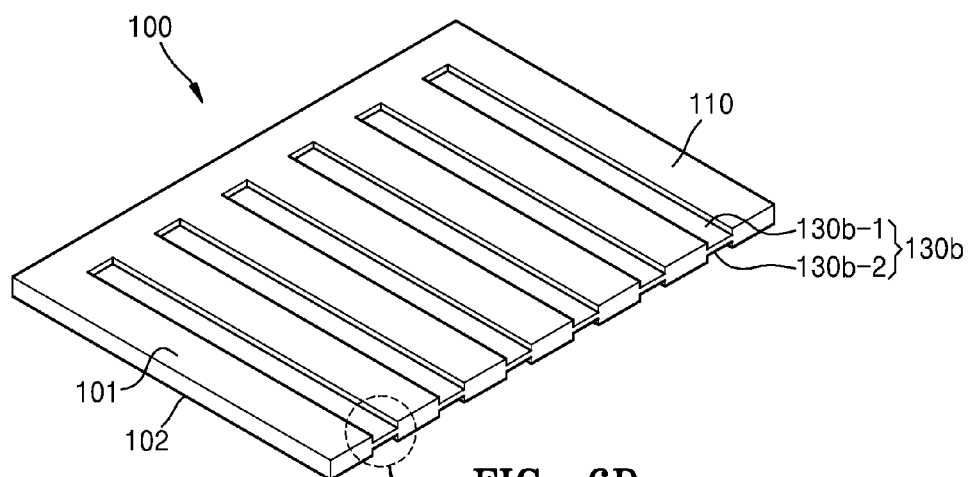
FIG. 6C is a perspective views illustrating yet another embodiment of the gas diffusion layer.
Figure 6D:
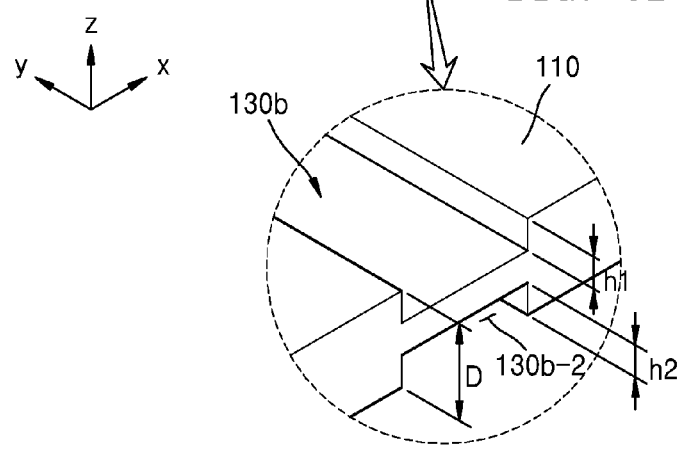
FIG. 6D is an expanded view of the indicated section of the gas diffusion layer shown in FIG. 6C.

For example, as illustrated in FIG. 6C and as shown in the expanded view of FIG. 6D, which is an expanded view of the indicated area of FIG. 6C, a plurality of air flow channels, e.g., a third air flow channel 130b-1 and a fourth air flow channel 130b-2, may be concave when viewed from the first surface 101 and the second surface 102 of the gas diffusion layer 100. The third and fourth air flow channels 130b-1 and 130b-2 may be disposed along the normal direction (e.g., the z direction) of the first surface 101. For example, the third and fourth air flow channels 130b-1 and 130b-2 may be disposed in a vertical orientation. The total height of the vertically-disposed third and fourth air flow channels 130b-1 and 130b-2, that is, the sum of the heights (h1+h2) may be less than the thickness D of the gas diffusion layer 100.

As illustrated in FIG. 3, the air flow channel 130 may extend in a single direction, for example, the y direction as shown in FIG. 3.

Figure 7A:
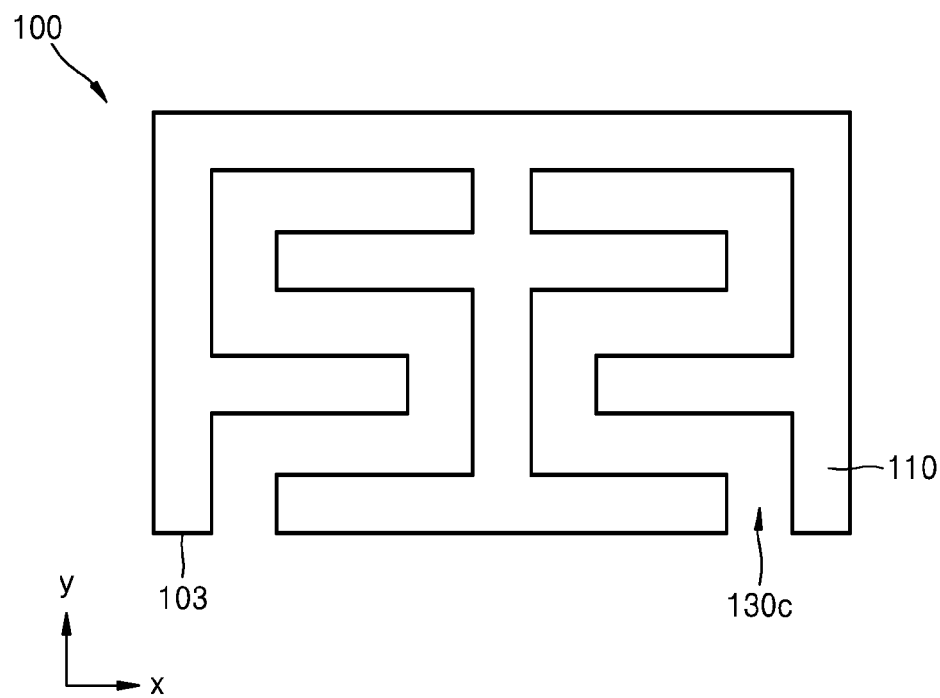
FIG. 7A is a plan view illustrating an embodiment of the gas diffusion layer.
Figure 7B:
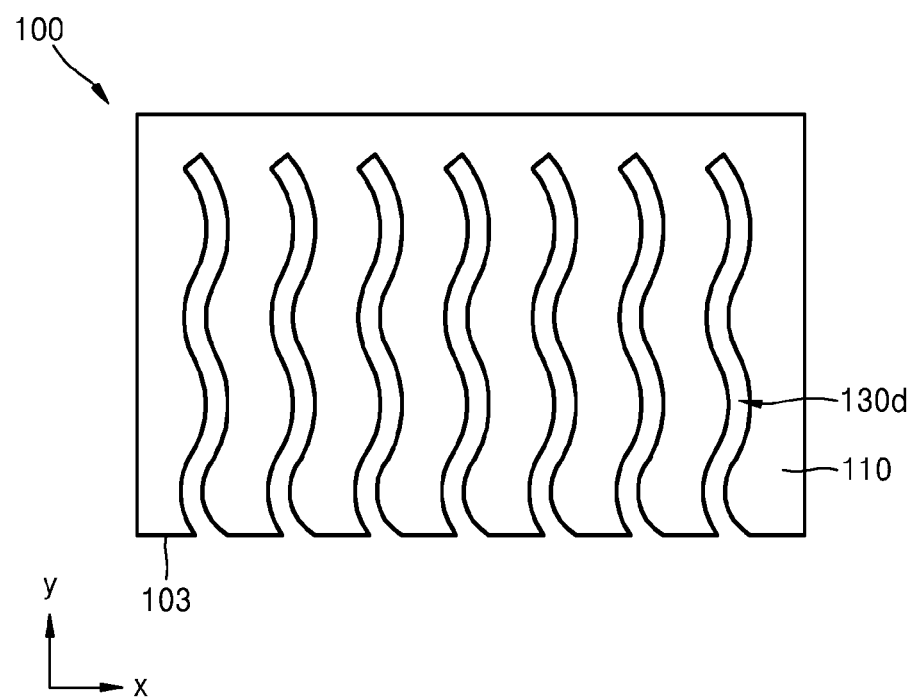
FIG. 7B is a plan view illustrating another embodiment of the gas diffusion layer.
Figure 8:
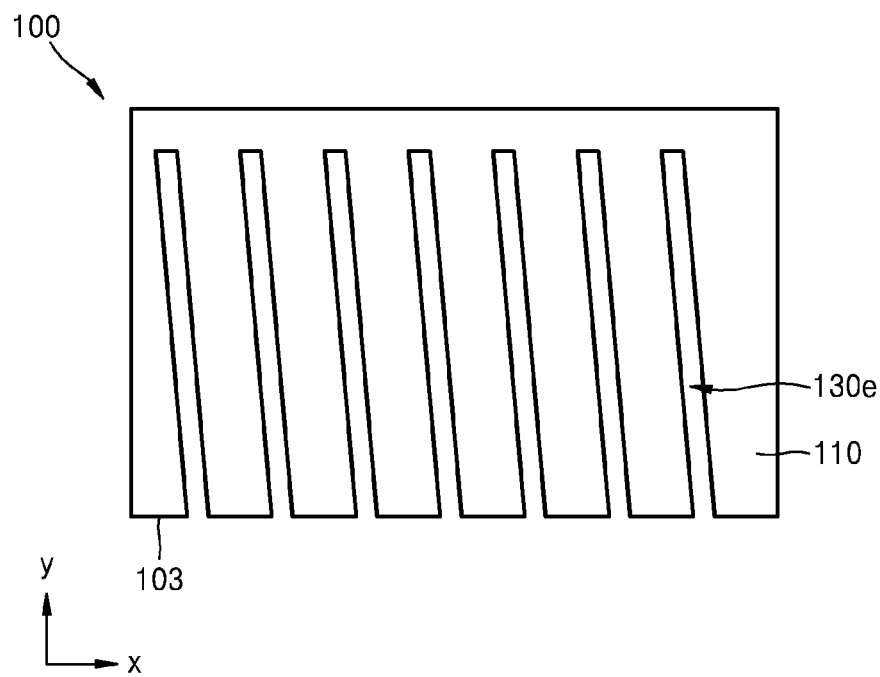
FIG. 8 is a plan view illustrating another embodiment of the gas diffusion layer.

In another embodiment, the air flow channel 130 may extend in two or more directions. For example, the air flow channel may be bent at a right angle as illustrated by fourth air flow channel 130c in FIG. 7A, or may be curved as illustrated by fifth air flow channel 130d as shown in FIG. 7B. As above, the air flow channel may include a straight section extending in a straight line and/or a curved section extending in a curved line. As another example, as illustrated in FIG. 8, a sixth air flow channel 130e may extend at an angle from the first side surface 103, which is in exposed to the outside.

Figure 9:
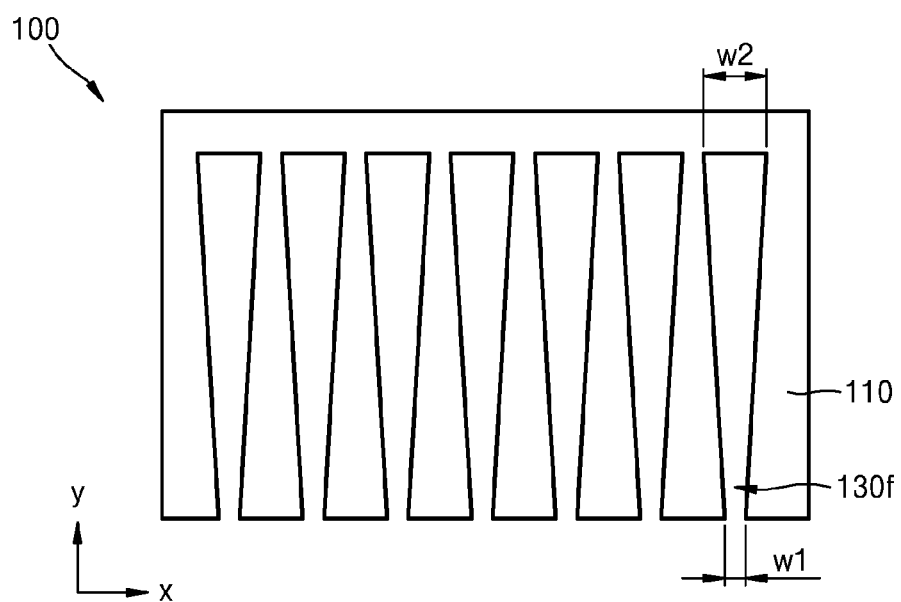
FIG. 9 is a plan view illustrating another embodiment of the gas diffusion layer.

The width w of the air flow channel 130 can be maintained uniformly along the extension direction. However, the width of the air flow channel 130 is not limited thereto, and may vary along the extension direction. For example, as illustrated in FIG. 9, the width of a tenth air flow channel 130f may increase along the extension direction. For example, a first width w1 of the inlet of the tenth air flow channel 130f adjacent an outer surface may be smaller than a second width w2 of the tenth air flow channel 130f at a location inside the gas diffusion layer 100. As illustrated in FIG. 9, the width of the tenth air flow channel 130 may increase continuously. However, the variation in the width of the air flow channel 130 is not limited thereto and may increase stepwise, or in another manner, for example sinusoidally or to form a fractal shape.

Figure 10A:
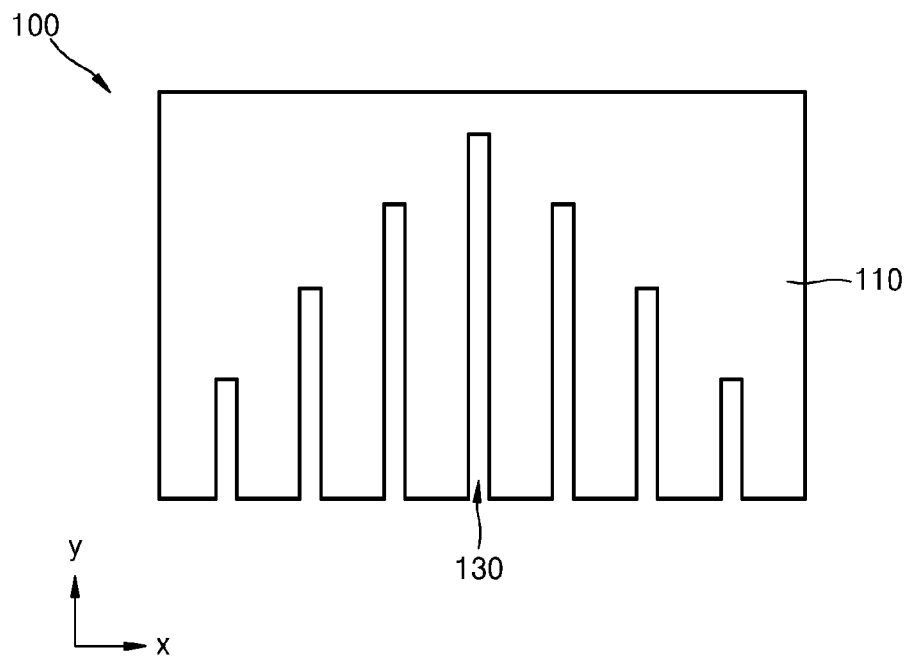
FIG. 10A is a plan view illustrating another embodiment of the gas diffusion layer.
Figure 10B:
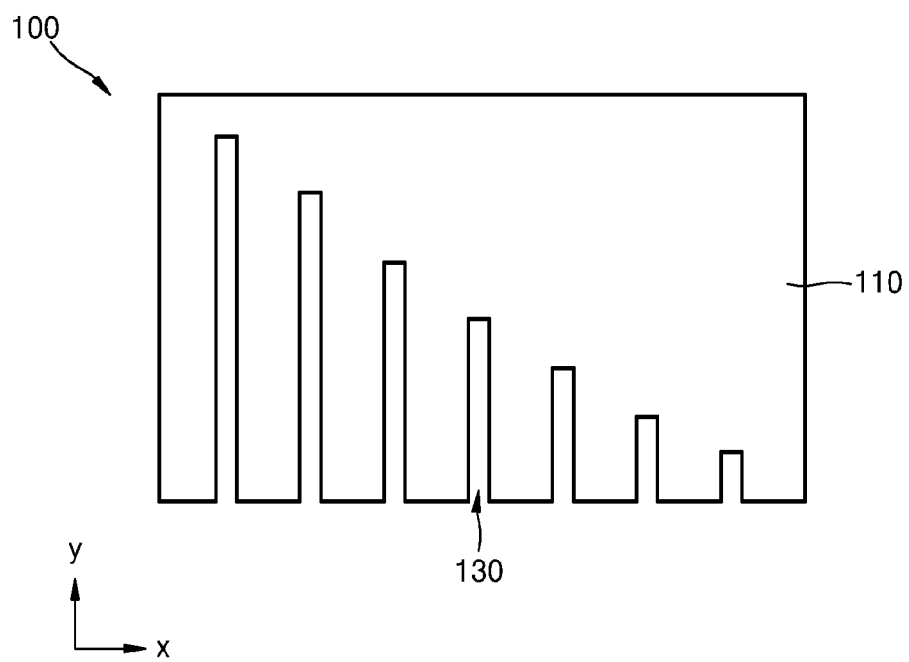
FIG. 10B is a plan view illustrating yet another embodiment of the gas diffusion layer.

In an embodiment, the air flow channels of a plurality of air flow channels have the same shape. However, the shapes of the plurality of air flow channels 130 need not be the same as each other, and at least a portion thereof may vary as desired. For example, a plurality of air flow channels 130 may comprise air flow channels having a symmetrical configuration as illustrated in FIG. 10A and/or may comprise air flow channels having an asymmetrical configuration as illustrated in FIG. 10B.

Figure 11A:
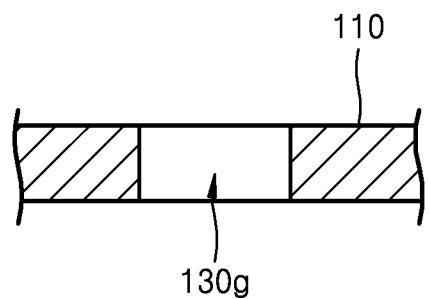
FIG. 11A is a schematic diagram illustrating an embodiment of a sectional shape of the air flow channel of the gas diffusion layer.
Figure 11B:
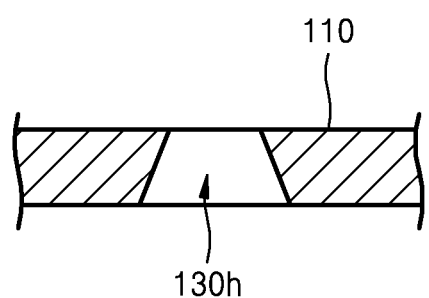
FIG. 11B is a schematic diagram illustrating another embodiment of a sectional shape of the air flow channel of the gas diffusion layer.
Figure 11C:
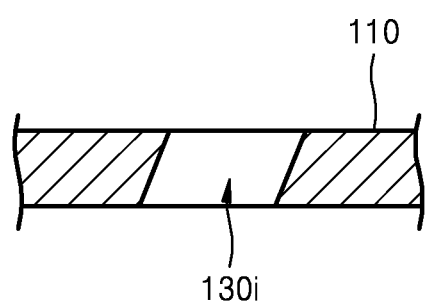
FIG. 11C is a schematic diagram illustrating yet another embodiment of a sectional shape of the air flow channel of the gas diffusion layer.

In addition, various examples of the planar shape of the air flow channel 130 have been described in the above embodiments. The sectional shape of the air flow channel 130 may also vary as desired. For example, the sectional shape of the air flow channel 130 may have a polygonal shape, for example a circular cross-sectional shape, a stadium cross-sectional shape, a square cross-sectional shape, a rectangular cross-sectional shape, a triangular cross-sectional shape, or an elliptical cross-sectional shape. The sectional shape of the air flow channel 130 may have a rectangular shape as illustrated by air flow channel 130g in FIG. 11A, may have a trapezoidal shape as illustrated by air flow channel 130h in FIG. 11B, or may have a parallelogramic shape as illustrated by air flow channel 130h in FIG. 11C. As another example, the sectional shape of the air flow channel 130 may have a circular shape or an elliptical shape.

Figure 12:
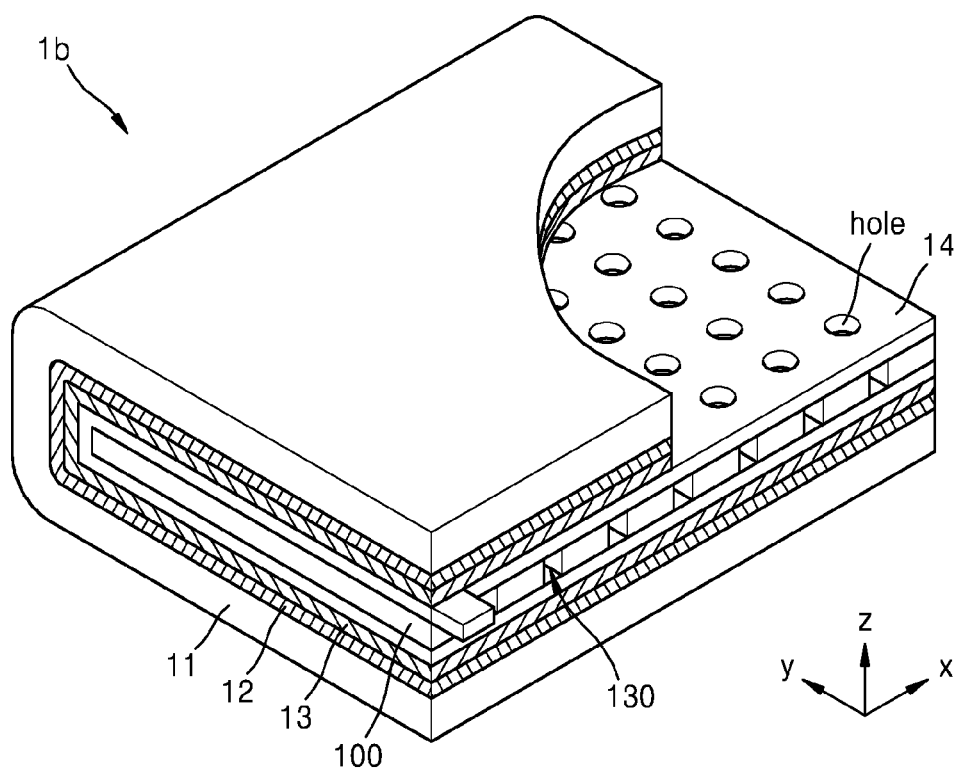
FIG. 12 is a cutaway perspective view of another embodiment of the metal air battery.

FIG. 12 is a cutaway perspective view of a metal air battery 1b according to another embodiment. For convenience of description, portions of a negative electrode metal layer 11, a second electrolyte 12, and a positive electrode layer 13 including the first electrolyte are cut away in FIG. 12.

Referring to FIG. 12, the metal air battery 1b includes a negative electrode metal layer 11, a second electrolyte 12, a positive electrode layer 13 including the first electrolyte, a gas diffusion layer 100, and a positive electrode current collector 14.

In the present embodiment, redundant descriptions of the same configurations as the above exemplary embodiments will be omitted for clarity, and differences therebetween will be described.

The gas diffusion layer 100 may include an insulating material. The positive electrode current collector 14 may be disposed between the positive electrode layer 13 and the gas diffusion layer 100 including the insulating material.

The positive electrode current collector 14 may include a plurality of pores (e.g., holes). The positive electrode current collector 14 may include at least one selected from perforated metal, punched metal, porous metal, foamed metal, and mesh metal. However, the positive electrode current collector 14 is not limited thereto and may include any suitable alloy or metal including a plurality of pores.

The positive electrode current collector 14 including a plurality of pores may include a gas flow path that passes through the positive electrode current collector 14. Since the positive electrode current collector 14 includes the gas flow path, the air supplied from the gas diffusion layer 100 may be supplied to the positive electrode layer 13 through the gas flow path. The shape of the gas flow path is not particularly limited. The gas flow path may be formed by a single through hole or by connection between a plurality of pores.

The porosity of the positive electrode current collector 14 may be about 50% or more, about 55% or more, about 60% or more, about 70% or more, about 75% or more, or about 80% or more, or 50% to 99%, or 60% to 95%. The porosity of the positive electrode current collector 14 may refer to the percentage of the volume of the pores in the total volume of the positive electrode current collector 14. As the porosity of the positive electrode current collector 14 increases, the gas supply thereof may become easier and the weight thereof may decrease.

The disclosed embodiment will be further described through the following Examples and Comparative Examples. However, the examples are merely for the purpose of illustration, and the scope of this disclosure is not limited thereto.

EXAMPLES (Manufacture of Lithium Air Batteries)

Comparative Example 1

Manufacture of Conventional Lithium Air Battery (Manufacture of Positive Electrode Layer)

A first electrolyte of a positive electrode layer was obtained by dissolving 16.32 g of and polyethylene oxide (PEO, Mw=600,000, Aldrich, 182028) in 150 mL of acetonitrile to obtain a PEO solution, adding LiTFSi to the solution in the molar ratio of ethylene oxide to lithium ([EO]:[Li])=18:1, agitating the mixture, pouring the solution into a Teflon plate, drying it in a drying room at normal temperatures for two days, and then vacuum-drying it at 80° C., overnight to remove a solvent therefrom.

Carbon black (Printex®, Orion Engineered Chemicals, USA) was vacuum-dried (120° C., 24 hr).

A rectangular positive electrode layer was manufactured by weighing the carbon black, a PTFE binder, and the first electrolyte in a predetermined weight ratio, mechanically mixing (kneading) it, forming it to a thickness of about 30 µm in a roll press, and then drying it in a 60° C. oven. The weight ratio of the carbon black and the gel electrolyte in the positive electrode layer was about 1:5, and the binder content was about 30 wt %.

(Manufacture of a Second Electrolyte)

A second electrolyte was obtained by impregnating a porous separator (Celgard®) with a solution identical to the solution used to manufacture the first electrolyte, drying it in a drying room at normal temperatures for two days, and then vacuum-drying it (60° C., overnight) to remove a solvent therefrom. The thickness of the second electrolyte was about 70 µm to about 90 µm.

(Manufacture of Lithium Air Battery)

The second electrolyte was disposed on a surface of the positive electrode layer, and a lithium metal of a negative electrode metal layer with a thickness of about 30 µm was disposed on one surface of the second electrolyte.

A lithium air battery was manufactured by disposing a gas diffusion layer on another surface of the positive electrode layer and then bending the positive electrode layer, the second electrolyte, and the negative electrode metal layer such as the positive electrode layer surrounds at least three surfaces of the gas diffusion layer as illustrated in FIG. 1A. In this case, carbon paper (SIGRACET® GDL35BA by SGL Company) with a thickness of about 300 μm and without an air flow channel formed therein was used as the gas diffusion layer.

The manufactured lithium air battery has a structure in which cells are disposed on and under the gas diffusion layer. Since each cell has a horizontal length of about 3 cm, a vertical length of about 1 cm, and an area of about 3 $cm^2$, the lithium air battery has a total cell area of about 6 $cm^2$ (=3 cm×1 cm×2). Herein, the vertical length is defined as the length in the direction perpendicular to the exposed side surface of the gas diffusion layer.

Comparative Example 2

Manufacture of Conventional Lithium Air Battery

A lithium air battery of Comparative Example 2 was manufactured in the same way as the lithium air battery of Comparative Example 1, except for the vertical length and the area thereof. In the lithium air battery of Comparative Example 2, the vertical length was about 2 cm and the total cell area was about 12 $cm^2$ (=3 cm×2 cm×2).

Example 1

Manufacture of Lithium Air Battery (Manufacture of Positive Electrode Layer)
A positive electrode layer was manufactured in the same way as in Comparative Example 1.
(Manufacture of Second Electrolyte)
A second electrolyte was manufactured in the same way as in Comparative Example 1.
(Manufacture of Gas Diffusion Layer)
A gas diffusion layer having the same material as the gas diffusion layer of Comparative Example 1 and including a plurality of air flow channels as illustrated in FIG. 3 was manufactured by removing a region corresponding to a plurality of air flow channels in the vertical direction.
(Manufacture of Lithium Air Battery)
The second electrolyte was disposed on one surface of the positive electrode layer, and a lithium metal of a negative electrode metal layer with a thickness of about 30 μm was disposed on one surface of the second electrolyte.

A lithium air battery having a total cell area of about 6 $cm^2$ (=3 cm×1 cm×2) was manufactured by disposing a gas diffusion layer on another surface of the positive electrode layer and then bending the positive electrode layer, the second electrolyte, and the negative electrode metal layer such as the positive electrode layer surrounds at least three surfaces of the gas diffusion layer as illustrated in FIG. 1A. In the lithium air battery, one side surface of the gas diffusion layer is exposed to the outside, and thus the air flow channel is exposed to the outside.

Example 2

Manufacture of Lithium Air Battery

A lithium air battery of Exemplary Embodiment 2 was manufactured in the same way as the lithium air battery of Exemplary Embodiment 1, except for the vertical length and the area thereof. In the lithium air battery of Exemplary Embodiment 2, the vertical length was about 2 cm and the total cell area was about 12 $cm^2$ (=3 cm×2 cm×2).

Evaluation Example 1

Charge/Discharge Property Evaluation

Figure 13:
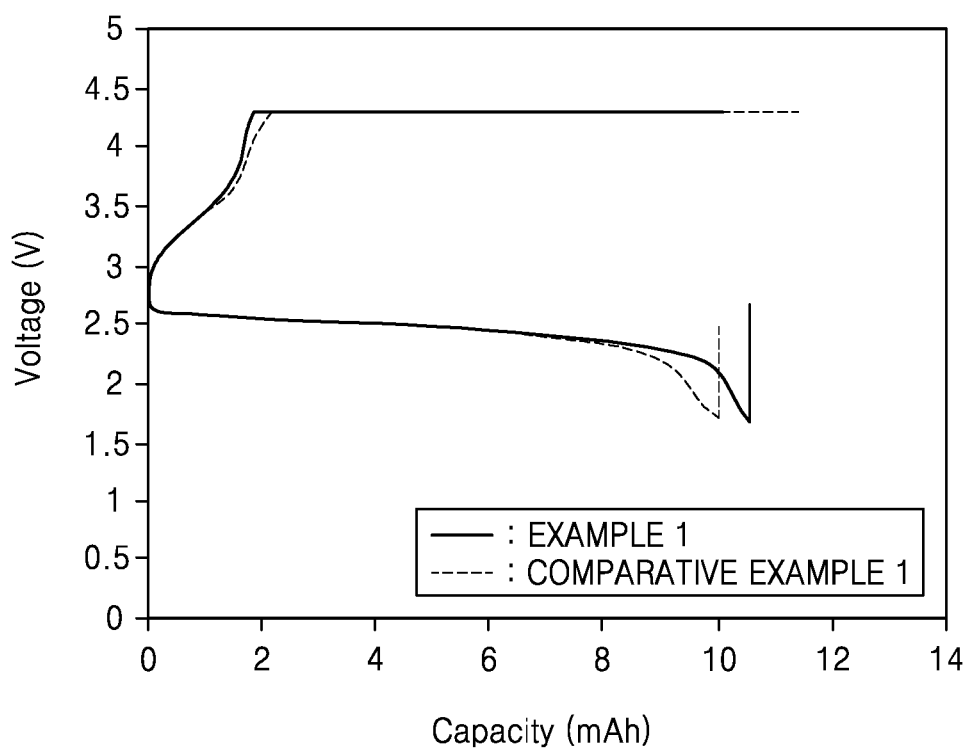
FIG. 13 is a graph of voltage (volts, V) versus capacity (milliampere-hours, mAh) illustrating the discharge capacities of metal air batteries manufactured according to Example 1 and a Comparative Example 1.

The lithium air batteries manufactured in Exemplary Embodiment 1 and Comparative Example 1 were discharged to about 1.7 V (vs. Li) by a constant current of about 0.24 mA/$cm^2$ in the 60° C. and 1 atm oxygen atmosphere, the discharge capacities thereof were measured, and the measurement results were shown in FIG. 13 and Table 1 below.

TABLE 1

| Configuration | Comparative Example 1 | Example 1 |
|---|---|---|
| Weight (mg) of Negative Electrode Metal Layer | 8.1 | 8.1 |
| Weight (mg) of Second electrolyte | 36 | 36 |
| Weight (mg) of Positive Electrode Layer | 6.0 | 6.0 |
| Weight (mg) of Gas Diffusion Layer | 32.4 | 17.8 |
| Total Weight (mg) of Lithium Air Battery | 82.5 | 67.9 |
| Total Energy Capacity (mAh) | 10.1 | 10.5 |
| Gravimetric Energy Density (Wh/kg) | 305 | 371 |

As shown in Table 1, the discharge capacity of the lithium air battery of Example 1, in which the air flow channel was about 4% larger than the discharge capacity of the lithium air battery of Comparative Example 1, is advantageous. The weight of the gas diffusion layer having the air flow channel according to Example 1 was about 45% less than the weight of the gas diffusion layer according to Comparative Example 1. Accordingly, the gravimetric energy density of the lithium air battery of Example 1 was about 21% greater than the gravimetric energy density of the lithium air battery of Comparative Example 1.

Evaluation Example 2

Charge/Discharge Property Evaluation

Figure 14:
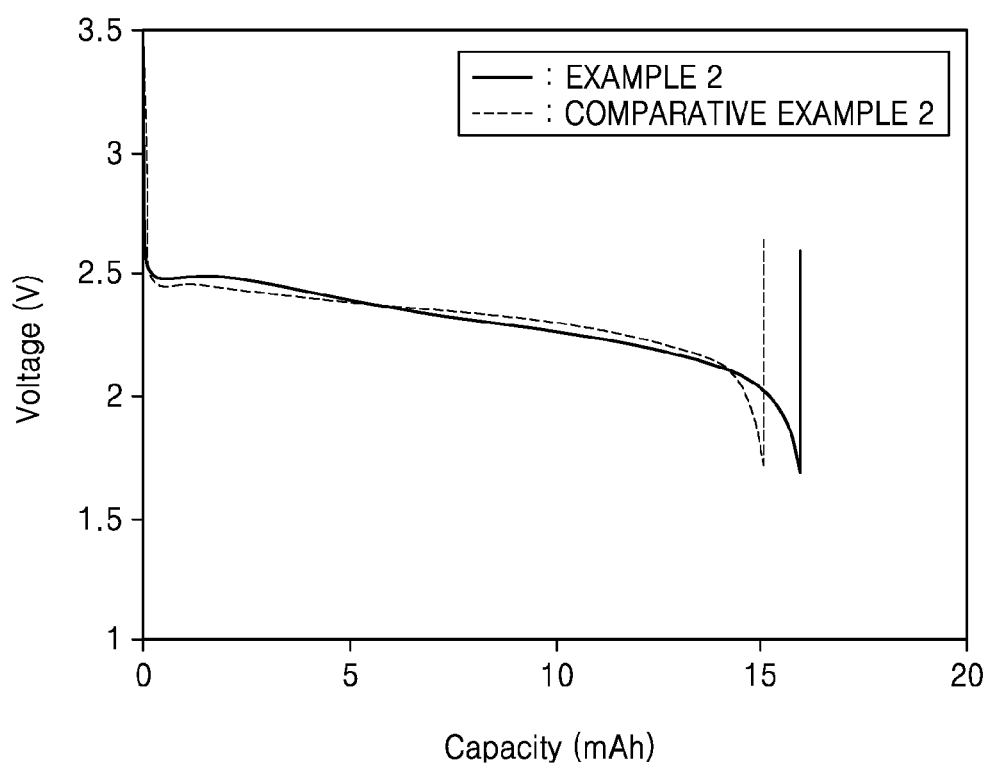
FIG. 14 is a graph of voltage (volts, V) versus capacity (milliampere-hours, mAh) illustrating the discharge capacities of metal air batteries manufactured according to Example 2 and a Comparative Example 2.

The lithium air batteries manufactured in Exemplary Embodiment 2 and Comparative Example 2 were discharged to about 1.7 V (vs. Li) by a constant current of about 0.24 mA/$cm^2$ in the 60° C. and 1 atm oxygen atmosphere, the discharge capacities thereof were measured, and the measurement results were shown in FIG. 14 and Table 2 below.

TABLE 2

| Configuration | Comparative Example 2 | Example 2 |
|---|---|---|
| Total Weight (mg) of Lithium Air Battery | 165.0 | 135.8 |
| Total Energy Capacity (mAh) | 15.1 | 15.9 |
| Gravimetric Energy Density (Wh/kg) | 228.8 | 292.7 |

As shown in Table 2, the discharge capacity of the lithium air battery of Example 2 was about 9% greater than the discharge capacity of the lithium air battery of Comparative Example 2. The gravimetric energy density of the lithium air battery of Example 2 was about 28% greater than the gravimetric energy density of the lithium air battery of Comparative Example 2.

It may be seen from the synthesis of Evaluation Examples 1 and 2 that as the total cell area (particularly, the vertical cell length) of the metal air battery increases, the influence of the air flow channel increases and thus the gravimetric energy density difference increases.

According to the exemplary embodiment, since the metal air battery and the gas diffusion layer have the air flow channel, the air may be efficiently supplied and the gravimetric energy density may be improved.

The metal air battery may be used for both a metal primary battery and a metal secondary battery. Also, the shape of the metal air battery is not particularly limited and may include a coin shape, a button shape, a sheet shape, a stack shape, a cylindrical shape, a flat shape, or a horn shape. In addition, the metal air battery may also be applied to a large battery used in an electric car.

The term "air" used herein is not limited to the atmospheric air and may include a pure oxygen gas or a combination of gases including oxygen. The broad definition of the term "air" may be applied to all purposes such as air batteries and air electrodes.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A metal air battery comprising:
   a gas diffusion layer having a first surface and a second surface opposite to the first surface;
   at least one positive electrode layer disposed on the first surface and the second surface of the gas diffusion layer, wherein the positive electrode layer is configured to use oxygen as an active material and includes a first electrolyte;
   a second electrolyte disposed on the positive electrode layer; and
   a negative electrode metal layer disposed on the second electrolyte,
   wherein
      at least one side surface among side surfaces of the gas diffusion layer, which connect the first surface and the second surface of the gas diffusion layer, is exposed to an outside of the metal air battery, and
      the gas diffusion layer comprises at least one air flow channel that extends from the at least one side surface of the gas diffusion layer, which is exposed to the outside, to an inside of the gas diffusion layer.

2. The metal air battery of claim 1, wherein the at least one air flow channel extends in a direction which intersects a normal direction of the first surface.

3. The metal air battery of claim 2, wherein
   the metal air battery comprises a plurality of air flow channels, and
   the air flow channels of the plurality of air flow channels are spaced apart from each other in a direction intersecting the normal direction of the first surface and intersecting the extension direction of the air flow channel.

4. The metal air battery of claim 1, wherein
   the side surfaces of the gas diffusion layer include a first side surface and a second side surface which is opposite to the first side surface, and
   wherein the at least one air flow channel includes at least one first air flow channel, which extends in direction from the first side surface and towards the inside of the gas diffusion layer , and at least one second air flow channel which extends in a direction from the second side surface towards the inside of the gas diffusion layer.

5. The metal air battery of claim 1, wherein a height of the at least one air flow channel is equal to a thickness of the gas diffusion layer.

6. The metal air battery of claim 1, wherein a height of the at least one air flow channel is less than a thickness of the gas diffusion layer.

7. The metal air battery of claim 6, wherein
   the metal air battery comprises a plurality of air flow channels, and
   wherein the air flow channels of the plurality of air flow channels are disposed along a normal direction of the first surface.

8. The metal air battery of claim 1, wherein the at least one air flow channel includes a straight section extending in a straight line, or a curved section extending in a curved line.

9. The metal air battery of claim 1, wherein
   the metal air battery comprises a plurality of air flow channels, and
   wherein the air flow channels of the plurality of air flow channels are disposed symmetrically or asymmetrically.

10. The metal air battery of claim 1, wherein a cross-sectional shape of the air flow channel includes at least one of a polygonal shape, a circular shape, and an elliptical shape.

11. The metal air battery of claim 1, wherein a total area of the at least one air flow channel is about 1 percent or more, based on a total area of the gas diffusion layer.

12. The metal air battery of claim 1, wherein a width of the at least one air flow channel is about 0.1 millimeter to about 5 millimeters.

13. The metal air battery of claim 1, wherein a width of the at least one air flow channel is maintained uniformly along an extension direction of the at least one air flow channel.

14. The metal air battery of claim 1, wherein a width of the at least one air flow channel varies along an extension direction of the at least one air flow channel.

15. The metal air battery of claim 1, wherein the positive electrode layer is bent as a single layer to face the first surface, the second surface, and a single side surface among the side surfaces of the gas diffusion layer.

16. The metal air battery of claim 15, wherein
   the gas diffusion layer is disposed partially on the positive electrode layer,
   the negative electrode metal layer, the second electrolyte, and the positive electrode layer are bent onto the gas diffusion layer such that the positive electrode layer contacts the first surface and the second surface of the gas diffusion layer, and
   wherein a single side surface of the gas diffusion layer is exposed to the outside.

17. The metal air battery of claim 16, wherein
   the metal air battery comprises a plurality of gas diffusion layers, and
   the negative electrode metal layer, the second electrolyte, and the positive electrode layer are repeatedly bent such that the positive electrode layer contacts each of a first surface and a second surface of each gas diffusion layer of the plurality of gas diffusion layers.

18. The metal air battery of claim 1, wherein
the positive electrode layer includes a first positive electrode layer and a second positive electrode layer which is spaced apart from the first positive electrode,
wherein the first positive electrode layer is disposed on the first surface of the gas diffusion layer, and
wherein the second positive electrode layer is disposed on the second surface of the gas diffusion layer.

19. The metal air battery of claim 1, further comprising a positive electrode current collector disposed between the positive electrode layer and the gas diffusion layer, wherein the positive electrode current collector further comprises a plurality of pores.

20. A method of manufacturing the metal air battery of claim 1, the method comprising:
providing a gas diffusion layer comprising an air flow channel that extends from a side surface of the gas diffusion layer to an inside of the gas diffusion layer;
disposing a positive electrode layer on a first surface and on a second surface of the gas diffusion layer, wherein the first surface of the gas diffusion layer is opposite to the second surface of the gas diffusion layer, and wherein the positive electrode layer comprises a first electrolyte;
disposing second electrolyte on the positive electrode layer; and
disposing a negative electrode metal layer on the second electrolyte to manufacture the metal air battery,
wherein the side surface of the gas diffusion layer connects the first surface and the second surface of the gas diffusion layer and is exposed to an outside of the metal air battery.

* * * * *